UNITED STATES PATENT OFFICE.

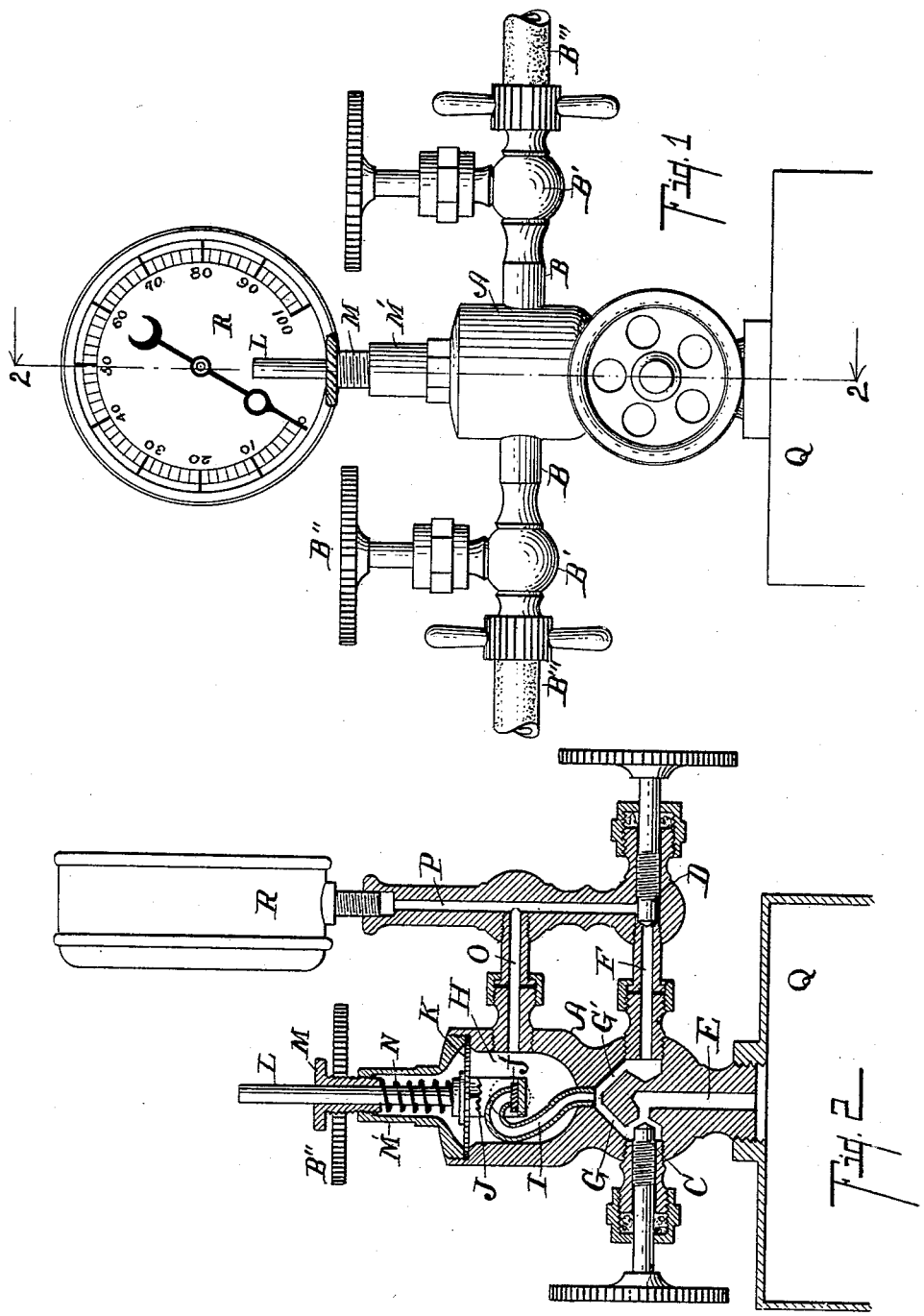

HARLEY M. DUNLAP, OF BATTLE CREEK, MICHIGAN.

PRESSURE-REGULATOR AND CONNECTION.

SPECIFICATION forming part of Letters Patent No. 632,808, dated September 12, 1899.

Application filed September 26, 1898. Serial No. 691,934. (No model.)

*To all whom it may concern:*

Be it known that I, HARLEY M. DUNLAP, a citizen of the United States, residing at the city of Battle Creek, in the county of Calhoun and State of Michigan, have invented certain new and useful Improvements in Pressure-Regulators and Connections, of which the following is a specification.

This invention relates to improvements in pressure regulators or reducers and to suitable connections enabling the proper determination of relative and absolute pressure in the various parts connected.

The objects of this invention are, first, to provide for use, in connection with compressed-air tanks or for use in connection with steam-boilers for that matter, of an improved pressure-regulating device which shall be simple in construction and efficient in operation; second, to provide, in connection with the pressure-regulator, suitable valves and connections whereby the operator can easily determine from a single pressure-gage the pressure in the supply-tank and also reduced pressure which is to be delivered by very simple manipulation.

Further objects will definitely appear in the detailed description to follow.

I accomplish these objects of my invention by the devices and means described in this specification.

The invention is definitely pointed out in the claims.

The structure is fully illustrated in the accompanying drawings, forming a part of this specification, in which—

Figure 1 is front elevation of the same, showing a tank in conventional form. Fig. 2 is a vertical detail transverse sectional view taken on line 2 2 of Fig. 1, looking in the direction of the little arrows at the end of the sectional line.

Similar letters of reference refer to similar parts throughout the several views.

In the drawings, Q represents the pressure-tank, to which my improved regulator and mechanism are connected.

A is the main body of the regulator, which contains a hollow chamber H in its upper portion and through which a passage E leads up from tank Q below, which passage is provided with a stop-cock C. The passage continues beyond the stop-cock within the casing A at G. A tube I, the upper end of which is reversed, is inserted into the bottom of the hollow portion H and connects to the passage G. The passage G continues laterally through the casing A at G' and is connected by a pipe F with suitable couplings to a vertical pipe P. The pipe F is closed by a suitable valve or stop-cock D, actuated by a hand-wheel. The pipe P is connected at its upper end to a suitable pressure-gage R. A cross-pipe O, with suitable connections, connects the pipe P at a point between the pressure-gage R and the valve D with the chamber H.

Over the upper part of the chamber H is a diaphragm K, secured in position by a suitable cap M'. On the under side of the diaphragm is a suitable stirrup J, having a packing J' at the bottom adapted to be raised against the reversed end of the pipe I to close the same. A stem L is secured opposite the stirrup J and projects out through a suitable tubular thumb-nut M, which is threaded on its outside and engages screw-threads within the cap M'. A spring N is on the stem L and rests against the thumb-nut M above and against the shoulder or nut on the stem L just above the diaphragm K. Thus it will be seen that the tension on the spring N can be varied by the adjustable nut M.

Connected to each side of the main casing A and delivering from the chamber H are pipes B with suitable globe-valves B', adapted to couple to any tube or part B'''. I provide a pair of these, so that the connection can be easily made from either side, though the single coupling would be all that is really required in any single instance.

Having thus specifically and minutely described the various parts of my improved pressure-regulating apparatus and connection, I will now state their operation.

Air under pressure in the tank Q will pass through the passage E, up through the passage G, through the tube I, into the chamber H. When the pressure in the chamber H becomes sufficient, the diaphragm K will be raised and the tube I closed by the stirrup J raising the packing J' against the opening of the tube. Air will also pass through the pipes O and P to the pressure-gage R, and the pressure within the chamber H can thus be easily read. If the pressure is more than is desired, the amount can be regulated by screwing the thumb-nut M up, which will relieve the pressure on the spring and permit the valve to be closed that much quicker, or if the pressure is insufficient the thumb-nut M can be screwed down to secure a greater resistance to the diaphragm, which will increase the pressure within the chamber. It will of course be necessary in determining the pressure after each adjustment to open the delivery-pipe B''' to allow a little air to escape, so that the pressure will become normal for the particular adjustment.

If at any time that it is desired for any reason to know the exact pressure within the tank, the valve D can be opened and the direct pressure of the tank will be read on the pressure-gage R. When the valve D is closed, the pressure-regulator then performs its work. Otherwise the full pressure is delivered. The gage always shows full pressure delivered.

When the apparatus is not in use, the valve C can be closed and all leakage practically prevented and unnecessary pressure on all parts of the apparatus be relieved.

Having thus fully and specifically described my improved pressure-regulator and connections, I desire to state that the particular connection for the pressure-gage could be employed with almost any style of pressure-regulator without departing from my invention in that particular, and of course the exact couplings could also be varied or tubes and pipes used without couplings and any kind of stop cock or valve be employed.

This exact construction of regulator I believe to possess merit over any other, and I therefore desire to claim the same specifically alone, as well as generally, along with my special connections.

Having thus described my invention, what I claim as new, and desire to secure by Letters Patent, is—.

1. In a pressure-regulator and connection the combination of the main casing A, having passage E, provided with stop-cock C, passage G, and G', leading through the same and having a chamber H, therein, a tube I, curved backwardly on itself within the chamber H, a diaphragm K, with a suitable stirrup bearing a packing adapted to raise and close the tube I, a cap M', for retaining the diaphragm in place; a stem L, secured to the diaphragm; a spring surrounding the stem to exert pressure on the same; an adjustable thumb-nut for adjusting the tension on the spring, a connecting-tube F, delivering to tube P, a pressure-gage connecting with tube P; a second tube O, connecting the chamber H, to the pipe P, and a stop cock or valve D, to close the tube F, all coacting for the purpose specified.

2. The combination in a pressure-regulator and connection of a suitable main casing containing means for regulating the pressure, a pipe connecting said main casing below the pressure-regulator with a pressure-gage a valve for closing the same and a pipe connecting the first-named pipe and the pressure-gage directly with the casing beyond the pressure-regulator so that by opening an additional valve the tank-pressure could be read on the same gage indicating reduced pressure as specified.

In witness whereof I have hereunto set my hand and seal in the presence of two witnesses.

HARLEY M. DUNLAP. [L. S.]

Witnesses:
 FRED. WELLS,
 H. A. ROWLES.